US010773350B2

(12) United States Patent
Miyake

(10) Patent No.: US 10,773,350 B2
(45) Date of Patent: Sep. 15, 2020

(54) MACHINE TOOL WITH WORK TRANSFERRING MECHANISM

(71) Applicant: Takisawa Machine Tool Co., Ltd., Okayama (JP)

(72) Inventor: Naruhito Miyake, Okayama (JP)

(73) Assignee: TAKISAWA MACHINE TOOL CO., LTD., Okayama (JP)

(*) Notice: Subject to any disclaimer, the term of this patent is extended or adjusted under 35 U.S.C. 154(b) by 0 days.

(21) Appl. No.: 16/398,515

(22) Filed: Apr. 30, 2019

(65) Prior Publication Data

US 2019/0351519 A1 Nov. 21, 2019

(30) Foreign Application Priority Data

May 16, 2018 (JP) ................................ 2018-094711

(51) Int. Cl.
*B23Q 5/22* (2006.01)
*B23Q 7/00* (2006.01)
(Continued)

(52) U.S. Cl.
CPC ............... *B23Q 5/225* (2013.01); *B23B 3/06* (2013.01); *B23Q 7/00* (2013.01); *B23B 3/30* (2013.01); *B23Q 2705/102* (2013.01)

(58) Field of Classification Search
CPC ......... B23B 3/06; B23B 3/30; B23Q 11/0891; B23Q 2705/102; B23Q 2707/003;
(Continued)

(56) References Cited

U.S. PATENT DOCUMENTS 3,895,424 A * 7/1975 Hautau ............. B23B 29/03471
29/38 C
3,963,271 A * 6/1976 Sugino .................... B25J 15/103
294/86.4
(Continued)

FOREIGN PATENT DOCUMENTS

DE 3329619 A1 * 3/1985 ............... B23Q 7/10
DE 3631718 A1 * 3/1988 ............. B23Q 7/165
(Continued)

OTHER PUBLICATIONS

Notification of Reasons for Refusal for Japanese Application No. 2018-094711; dated Jun. 6, 2018.
(Continued)

*Primary Examiner* — Sara Addisu
(74) *Attorney, Agent, or Firm* — Pearne & Gordon LLP

(57) ABSTRACT

A machine tool with work transferring mechanism provided with a work transferring mechanism which transfers a work and receives/delivers the work from/to a main spindle. In the front-rear direction, the space inside the machine tool is divided via a shutter into a machining space in which the main spindle is arranged and a transferring space in which the work transferring mechanism transfers the work. The work transferring mechanism is equipped with a work retainer retaining the work and a moving mechanism moving the work retainer. While the work attached to the main spindle is machined, the work retainer is preliminarily moved by the moving mechanism to a vicinity of the main spindle via the shutter.

4 Claims, 11 Drawing Sheets

(51) Int. Cl.
  *B23B 3/06* (2006.01)
  *B23B 3/30* (2006.01)
(58) Field of Classification Search
  CPC .. B23Q 7/00; B23Q 7/04; B23Q 7/048; Y10T 82/2514; Y10T 82/2524; Y10T 82/2521; Y10T 82/2516
  See application file for complete search history.

(56) References Cited

U.S. PATENT DOCUMENTS

| | | | | |
|---|---|---|---|---|
| 3,995,524 | A * | 12/1976 | Lederer | B23B 3/30 82/125 |
| 4,302,144 | A * | 11/1981 | Hallqvist | B23Q 7/04 414/225.01 |
| 5,174,071 | A * | 12/1992 | Tommasini | B23Q 1/66 451/332 |
| 6,055,892 | A * | 5/2000 | Otake | B23Q 7/003 414/14 |
| 7,150,213 | B2 * | 12/2006 | Bautz | B23Q 7/02 82/122 |
| 10,007,247 | B2 | 6/2018 | Sagasaki | G05B 19/182 |
| 2005/0076756 | A1 * | 4/2005 | Milicua | B23Q 7/04 82/124 |
| 2008/0069680 | A1 * | 3/2008 | Kato | B23Q 5/341 414/751.1 |
| 2008/0288102 | A1 * | 11/2008 | Conen | B23B 3/161 700/186 |
| 2010/0282037 | A1 * | 11/2010 | Fujimoto | B23B 3/30 82/121 |
| 2010/0307300 | A1 * | 12/2010 | Kuriya | B23Q 7/10 82/125 |
| 2015/0258649 | A1 * | 9/2015 | Nakazawa | B23Q 7/04 82/124 |

FOREIGN PATENT DOCUMENTS

| | | |
|---|---|---|
| EP | 3 205 447 A1 | 8/2017 |
| JP | 06190602 A * | 7/1994 |
| JP | H06 53002 U | 7/1994 |
| JP | 6-277974 A | 10/1994 |
| JP | H07 88702 A | 4/1995 |
| JP | 10-80837 A | 3/1998 |
| JP | 2002-113639 A | 4/2002 |
| JP | 2004-114258 A | 4/2004 |
| JP | 2004-330336 A | 11/2004 |
| JP | 2004-358567 A | 12/2004 |
| JP | 2010 179418 A | 8/2010 |
| JP | 2015-80816 A | 4/2015 |
| JP | 2016-74062 A | 5/2016 |

OTHER PUBLICATIONS

Notification of Reasons for Refusal for Japanese Application No. 2018-094711; dated Oct. 19, 2018.
Search Report issued in European Patent Application No. 19 17 3224 dated Nov. 28, 2019.

* cited by examiner (a)

(b)

MACHINE TOOL WITH WORK TRANSFERRING MECHANISM

TECHNICAL FIELD

The present invention relates to a machine tool with work transferring mechanism equipped with a work transferring mechanism that transfers a work and that receives/delivers the work from/to a main spindle.

BACKGROUND

There is known a machine tool equipped with a work transferring mechanism that transfers a work to a main spindle to receive/deliver the work from/to the main spindle and that receives the work machined from the main spindle to recover it (See JP 2004-330336 A and JP 2004-114258 A). The machine tool disclosed in JP 2004-330336 A is based on a parallel two-main-spindle lathe and characterized by a work reverser. In the case where a loader (work transferring mechanism) having two vertically arranged loader chucks is employed, it is possible to efficiently perform a loader operation for the reception/delivery of a work between the loader and a reverser chuck, and to shorten the loader ascent/descent stroke.

JP 2004-114258 A discloses a machine tool in which a machining region of the machine tool and a movement region in which a machined object transferring device (work transferring mechanism) moves are partitioned by a movement cover, so that the machined object transferring device cannot move while the worker is performing operation in the machining region, whereby it is possible to achieve an improvement in terms of safety and to achieve an improvement in terms of accessibility to the machining region when the worker is to perform operation in the machining region.

It should be noted, however, that in a machine tool, there is a demand for a reduction in operation time. The main object of the machine tool disclosed in JP 2004-330336 A is to prevent the loader operation from becoming complicated, and the main object of the machine tool disclosed in JP 2004-114258 A is to prevent an object adhering to the machined work from falling onto the plant floor and to achieve an improvement in terms of safety. That is, none of the machine tools in the prior art documents is endowed with a structure directly aiming at a reduction in operation time.

The present invention helps to solve the above-mentioned problem in the prior art. It is an object of the present invention to provide a machine tool with work transferring mechanism which quickly performs work reception/delivery between the main spindle and the work transferring mechanism, thereby making it possible to shorten the operation time.

SUMMARY

To achieve the above-mentioned object, there is provided, in accordance with the present invention, a machine tool with work transferring mechanism, including a work transferring mechanism that transfers a work and receives/delivers the work from/to a main spindle, wherein in a front-rear direction, a space inside the machine tool is divided via a shutter into a machining space in which the main spindle is arranged and a transferring space in which the work transferring mechanism transfers the work; the work transferring mechanism is equipped with a work retainer retaining the work, and a moving mechanism moving the work retainer; and while the work attached to the main spindle is being machined, the work retainer is preliminarily moved by the moving mechanism to a vicinity of the main spindle via the shutter.

In the machine tool with work transferring mechanism according to the present invention, in the front-rear direction, the space inside the machine tool is divided via the shutter into the machining space and the transferring space, so that even during the machining of the work, the work retainer with which the work transferring mechanism is equipped can preliminarily move to the vicinity of the main spindle via the shutter. Due to this fact, after the completion of the work, the work retainer can quickly approach the main spindle, making it possible to shorten the operation time.

In the machine tool with work transferring mechanism according to the present invention, it is desirable to adopt the following structure. During the machining of the work attached to the main spindle, it is desirable for the work retainer to be preliminarily moved by the moving mechanism to a position where the work retainer is opposite a front surface of the main spindle. In this structure, for the work retainer to approach the main spindle, a movement of the work retainer in one direction suffices, which also helps to shorten the operation time.

During the machining of the work attached to the main spindle, it is desirable for the work retainer to be preliminarily moved to a position where the work retainer is opposite a front surface of the main spindle, and to be further moved toward the shutter. In this structure, the work retainer can approach the main spindle more quickly, making it possible to further shorten the operation time.

It is desirable that the machine tool with work transferring mechanism further include a main spindle moving mechanism moving the main spindle toward the transferring space. When the work is to be received/delivered from/to the main spindle, it is desirable for the main spindle to be preliminarily moved toward the transferring space by the main spindle moving mechanism. In this structure, it is possible to preliminarily move the main spindle toward the transferring space while the work is being transferred before machining and while the turret is away from the main spindle after the completion of the machining. As a result, the moving distance for the work retainer to receive/deliver the work from/to the main spindle is shortened, making it possible to shorten the operation time.

The present invention provides the effect as described above. In the front-rear direction, the space inside the machine tool is divided into the machining space and the transferring space, so that even when the work is being machined, the work retainer with which the work transferring mechanism is equipped can preliminarily move to the vicinity of the main spindle via the shutter. As a result, the work retainer can quickly approach the main spindle after the completion of the machining of the work, making it possible to shorten the operation time.

DETAILED DESCRIPTION OF THE EMBODIMENTS

Figure 1:
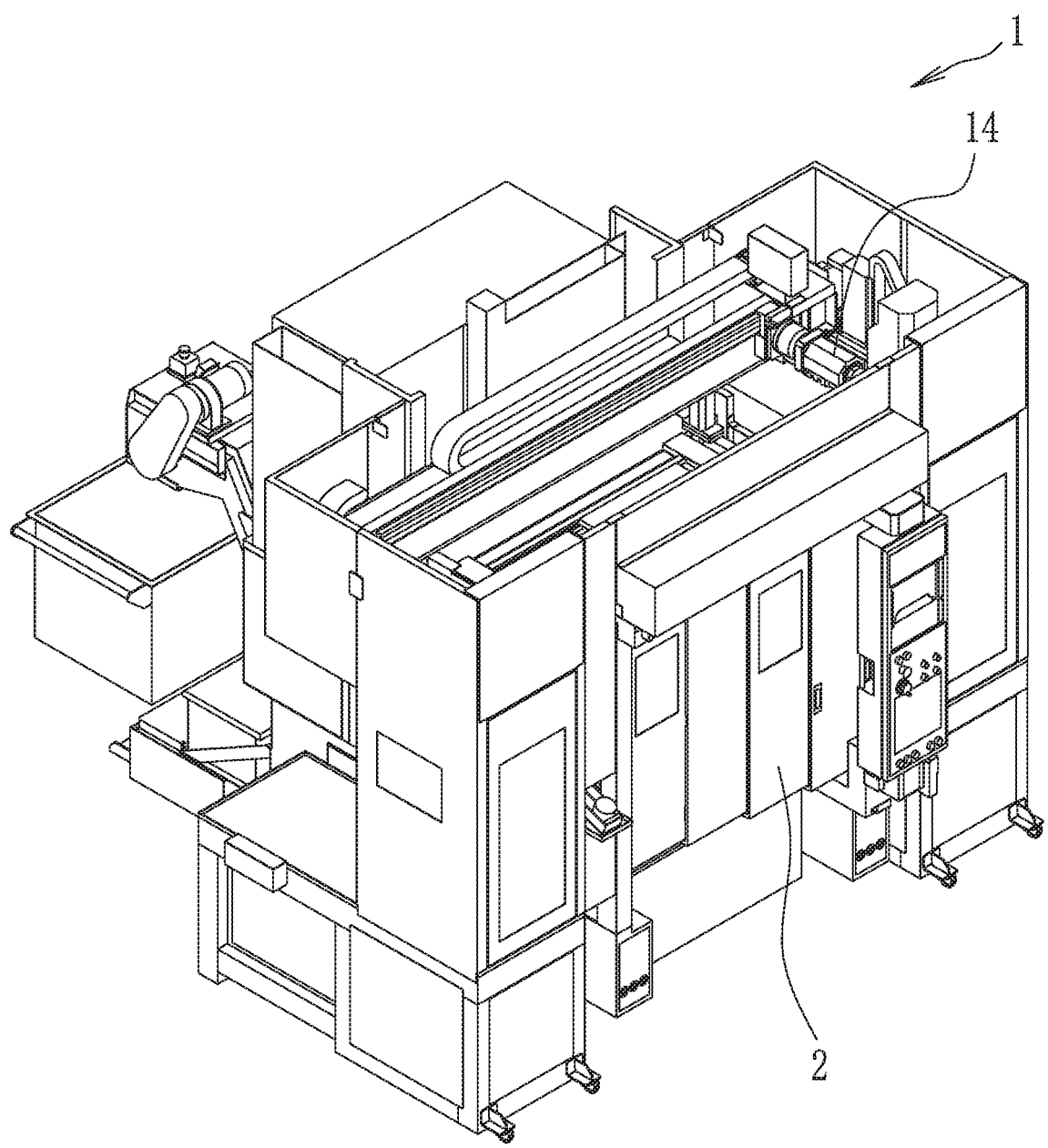
FIG. 1 is an external perspective view of a machine tool with work transferring mechanism according to an embodiment of the present invention.

In the following, an embodiment of the present invention will be described with reference to the drawings. FIG. 1 is an external perspective view of a machine tool with work transferring mechanism (hereinafter simply referred to as the "machine tool") 1 according to an embodiment of the present invention. On the inner side of a front door 2, the machine tool 1 is equipped with main mechanisms such as a main spindle, turret and a work transferring mechanism. In the present embodiment, the front door 2 side will be referred to as a front side, and the opposite side will be referred to as a rear side.

Figure 2:
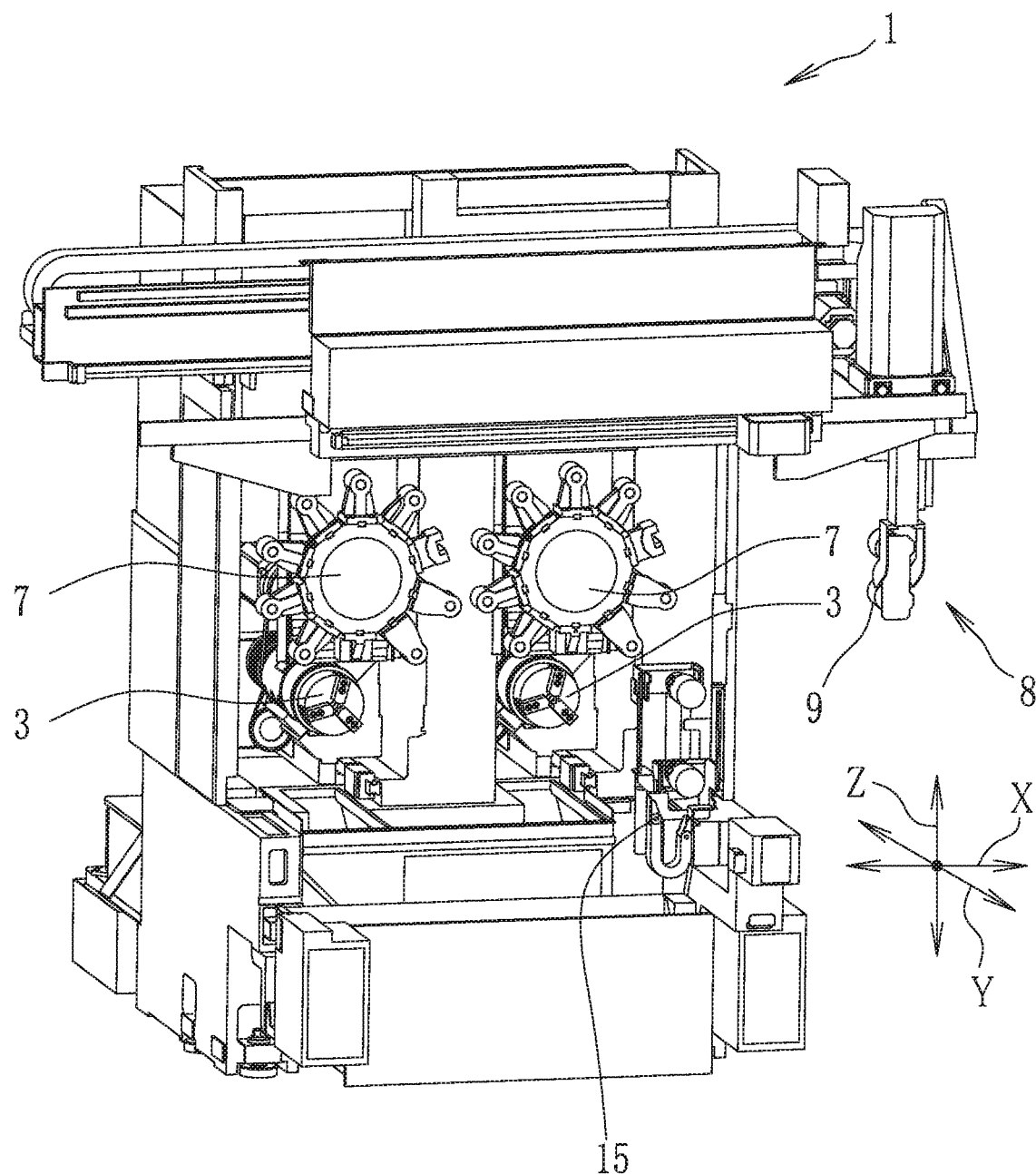
FIG. 2 is a perspective view of the interior of the machine tool with work transferring mechanism illustrated in FIG. 1.

FIG. 2 is a perspective view of the interior of the machine tool 1. The drawing omits the external portion of the machine tool 1 illustrated in FIG. 1, illustrating solely the main portion in the interior. The machine tool 1 is a parallel two-main-spindle lathe, in which two main spindles 3 are arranged parallel to each other. Above each main spindle 3, there is arranged a turret 7, and a work attached to the main spindle 3 is machined by a tool attached to a tip end of the turret 7. By the side of the main spindles 3, there is arranged a reversing mechanism 15. The reversing mechanism 15 is a mechanism for reversing a work.

On the front side of the machine tool 1, there is arranged a work transferring mechanism 8. The work transferring mechanism 8 is referred to as a loader. The work transferring mechanism 8 is equipped with a work retainer 9, to which a work is attached and can be transferred to the position of the main spindle 3 and of the reversing mechanism 15, making it possible to receive/deliver the work from/to the main spindle 3 and the reversing mechanism 15 and to receive the work from the main spindle 3 and the reversing mechanism 15. More specifically, the work transferring mechanism 8 is equipped with a moving mechanism moving the work retainer 9. There is no restriction regarding the moving mechanism so long as it is a mechanism moving the work retainer 9. In the present embodiment, the work retainer 9 is moved in the front-rear direction (Y-direction) and in the up-down direction (Z-direction) by a rack & pinion mechanism (not illustrated) operated by a servo motor (not illustrated). Similarly, it is moved in the right-left direction (X-direction) by a rack & pinion mechanism (not illustrated) operated by a servo motor 14 (see FIG. 1).

Figure 3:
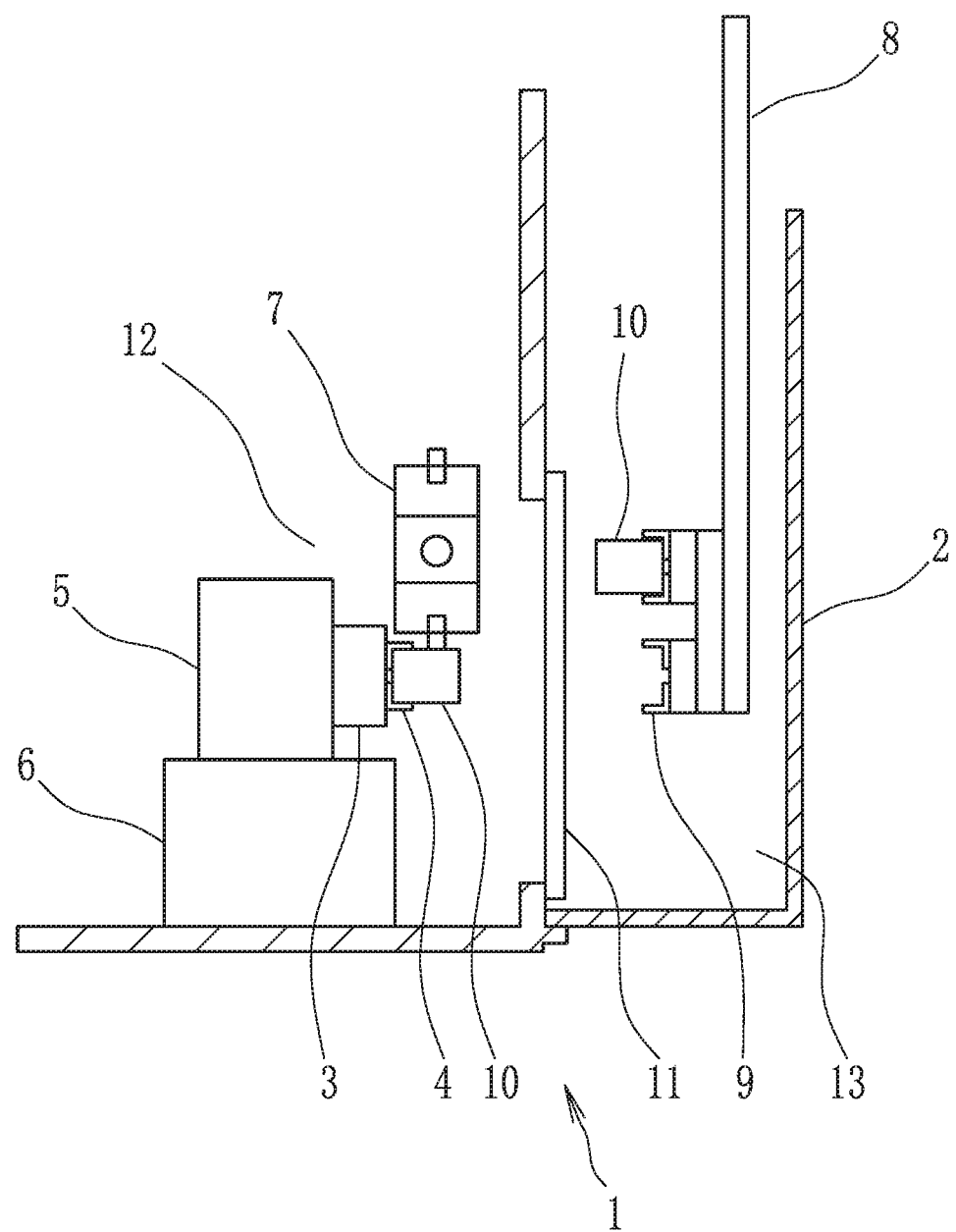
FIG. 3 is a side view of a main portion of the interior of the machine tool with work transferring mechanism according to an embodiment of the present invention.

FIG. 3 is a side view of a main portion of the interior of the machine tool 1. The drawing only illustrates the main portion of the interior of the machine tool 1, in a simplified fashion. In the front-rear direction, the inner space of the machine tool 1 is divided into two spaces via a shutter 11. One space is a machining space 12 in which the main spindles 3 are arranged, and the other space is a transferring space 13 in which the work transferring mechanism 8 is arranged. The transferring space 13 is a space between the shutter 11 and the front door 2, and the machining space 12 is a space adjacent to the rear side of the transferring space 13.

FIG. 3 illustrates the state in which the work 10 attached to the main spindle 3 is being machined. During the machining of the work 10, the shutter 11 is closed as illustrated in FIG. 3. The shutter 11 is opened when the work 10 is to be delivered to the main spindle 3 and when the work 10 is received by the work retainer 9 as described below. As illustrated in FIG. 3, in front of the main spindles 3, the shutter 11 closed during the machining of the work 10 partitions between the machining space 12 and the transferring space 13.

Each main spindle 3 arranged in the machining space 12 is equipped with a chuck 4 for retaining the work 10. The work 10 attached to the chuck 4 is machined by a tool (not illustrated) attached to the turret 7. Each main spindle 3 is integrated with a main spindle stock 5 and can be reciprocated in the front-rear direction on a base 6 integrally with the main spindle stock 5 by a main spindle moving mechanism (not illustrated). Thus, the main spindle 3 can both advance to move toward the transferring space 13 and retreat to return toward the machining space 12. It is only necessary for the main spindle moving mechanism to be one causing the main spindle 3 to slide in the front-rear direction. For example, it may be a mechanism driving a ball screw mechanism by a servo motor and causing a slide body integral with the main spindle 3 to slide along a guide rail.

The work transferring mechanism 8 arranged inside the transferring space 13 receives/delivers the transferred work 10 from/to the main spindle 3, and transfers the machined work 10 received from the main spindle 3 to the equipment for the next process. The work transferring mechanism 8 is equipped with the work retainer 9, and reciprocates the work retainer 9 in the transferring space 13, and attaches the work 10 to the work retainer 9 to transfer the work 10. The work 10 received/delivered from the work retainer 9 is attached to the main spindle 3, and the work 10 is machined by the tool (not illustrated) attached to the turret 7 as described above.

Figure 4:
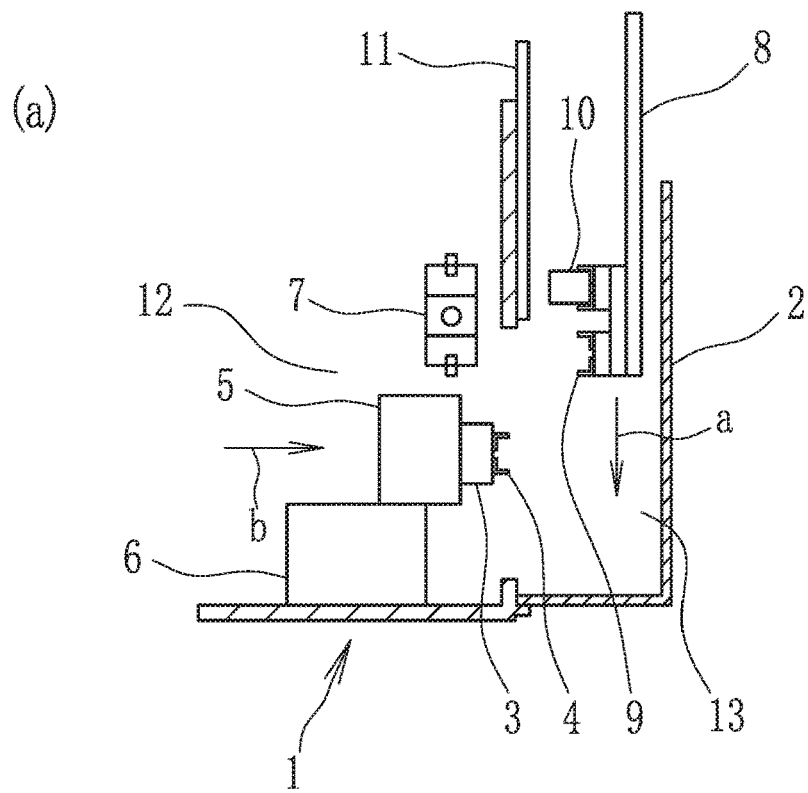
FIG. 4 is a side view illustrating an operation process according to an embodiment of the present invention, of which portion (a) is a side view illustrating a state in which a work transferring mechanism is transferring a work before machining, and portion (b) is a side view illustrating a state in which a work retainer is at rest after completing descent.
Figure 4:
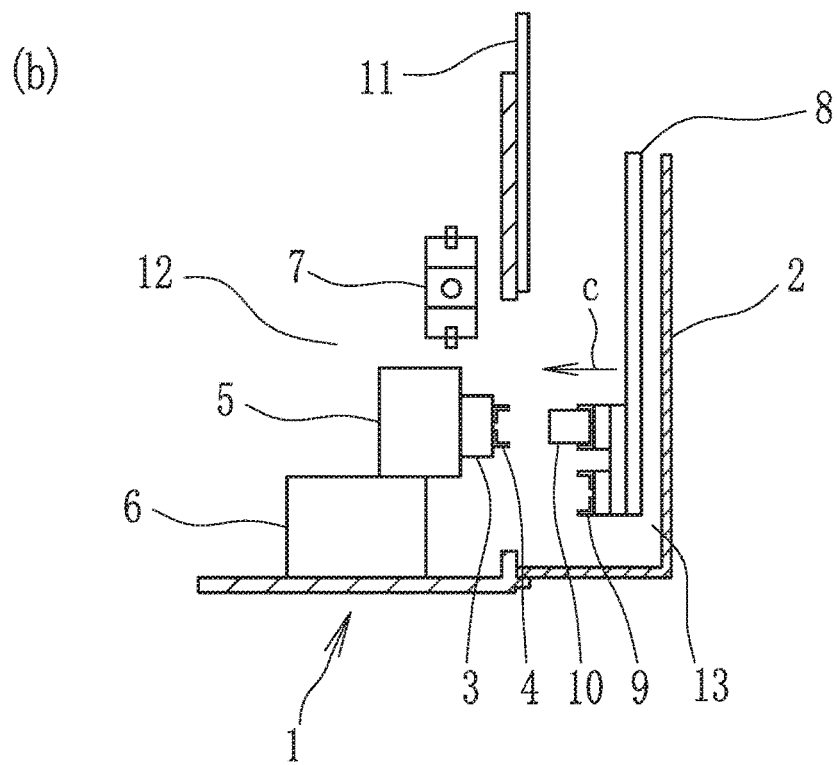

In the following, the operation of the machine tool 1 will be described one by one with reference to FIGS. 4 through 11. In this description, the operation of the reversing mechanism 15, which is not directly related to the characterizing portion of the operation of the machine tool 1, will be omitted. FIG. 4(*a*) is a side view illustrating a state in which the work transferring mechanism 8 is transferring the work 10 before machining. The work retainer 9 of the work transferring mechanism 8 retains the work 10. The work 10 is transferred from the preceding process. In the state of FIG. 4(*a*), the work retainer 9 is approaching the main spindle 3, and the work retainer 9 of the work transferring mechanism 8 is descending through the transferring space 13 (arrow a). At this time, the main spindle 3 is preliminarily moved toward the transferring space 13 by the main spindle moving mechanism (arrow b).

In this way, before the machining, the main spindle 3 is preliminarily moved toward the transferring space 13 (arrow b) to reach, for example, a position where the tip end of the chuck 4 is close to the surface of the shutter 11 closed. Preferably, it is a position where in the state in which the shutter 11 is open, the descent of the work 10 transferred from the transferring mechanism 8 is not hindered (e.g., a position close to the machining space 12 side end surface of the work 10). This control is performed based on the size of the work 10, the position of the shutter 11, etc. preliminarily input to a control device.

Figure 5:
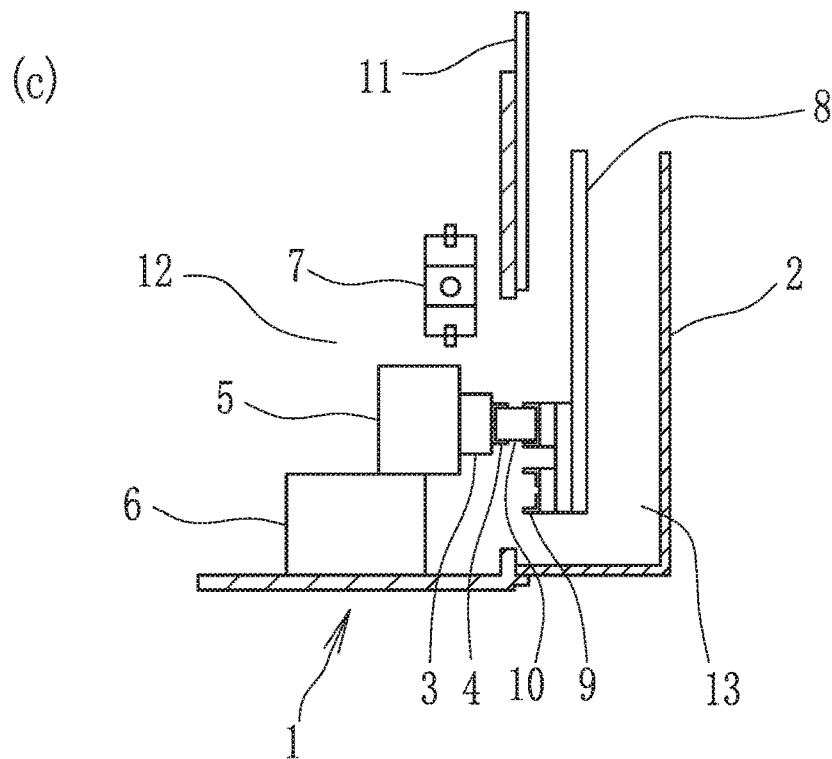
FIG. 5 is a side view illustrating an operation process subsequent to that of FIG. 4, of which portion (c) is a side view illustrating how the work of the work retainer is attached to the main spindle, and portion (d) is a side view illustrating a state in which the work has been attached to the main spindle.
Figure 5:
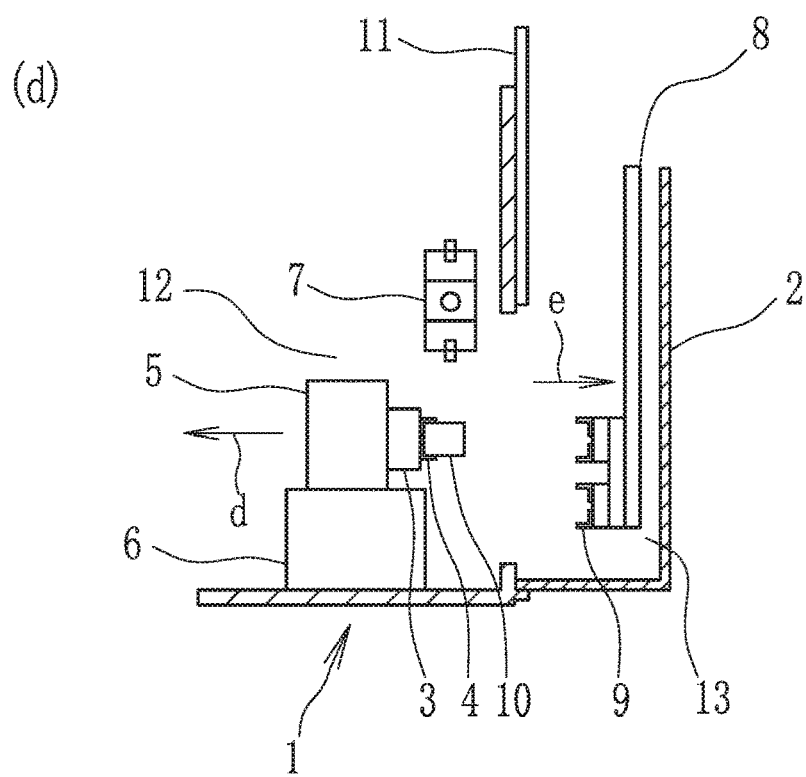

FIG. 4(*b*) illustrates a state in which the work retainer 9 is at rest after the completion of the descent. In the state of the drawing, the work 10 and the front surface of the main spindle 3 face each other. In this state, the work retainer 9 advances toward the main spindle 3 (arrow c), and the work 10 is delivered to the main spindle 3. FIG. 5(*c*) illustrates how the work 10 of the work retainer 9 is attached to the main spindle 3. As compared with the state of FIG. 4(*b*), in the state of this drawing, the work retainer 9 has more advanced toward the main spindle 3, with the work 10 being delivered to the main spindle 3. As described above, the main spindle 3 has preliminarily moved toward the transferring space 13, so that the distance through which the work retainer 9 advances for the reception/delivery of the work 10 from/to the main spindle 3 is shortened, thus achieving a reduction in operation time.

FIG. 5(*d*) illustrates the state after the attachment of the work 10 to the main spindle 3. In the state of this drawing, the main spindle 3 has retreated to the machining position of the work 10 from the state of FIG. 5(*c*) (arrow d), and the work retainer 9 advances (arrow e) to return to the position where its approach to the main spindle 3 is started (FIG. 4(*b*)).

Figure 6:
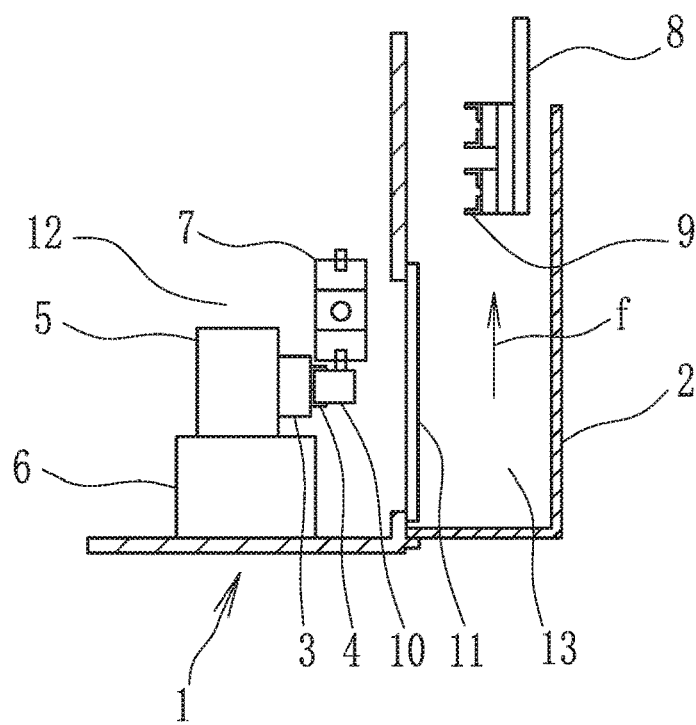
FIG. 6 is a side view illustrating an operation process subsequent to that of FIG. 5, of which portion (e) is a side view illustrating a state in which the work is being machined, and portion (f) is a side view illustrating a state in which the work transferring mechanism has transferred a new work to the vicinity of the main spindle.
Figure 6:
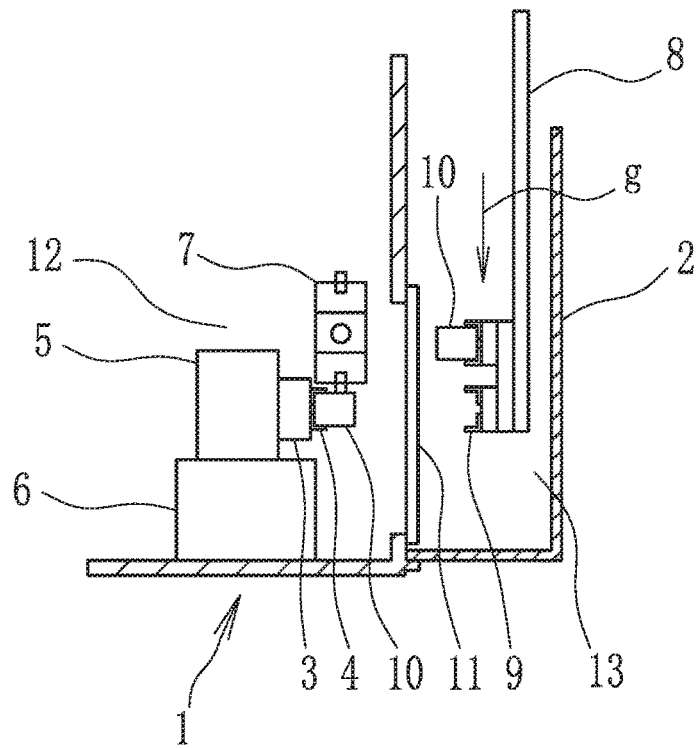

FIG. 6(*e*) illustrates the state in which the work 10 is being machined. In the state of this drawing, the shutter 11 is closed, and inside the machining space 12, the work 10 attached to the main spindle 3 is being machined by the tool attached to the turret 7. At this time, the work retainer 9 is moving backwards (arrow f) inside the transferring space 13 to receive the new work 10.

FIG. 6(*f*) illustrates the state in which the work transferring mechanism 8 has transferred the new work 10 to the vicinity of the main spindle 3. The work retainer 9 of the work transferring mechanism 8 is returned to the preceding process (backwards) from the state of FIG. 6(*e*). It receives the new work 10 to be machined, moves forwards (arrow g) toward the main spindle 3 again, and attains the state of FIG. 6(*f*) in which it is in the vicinity of the main spindle 3. In the state of this drawing, the empty portion (lower side) of the work retainer 9 is opposite the front surface of the main spindle 3.

In the state in which the work 10 is being machined inside the machining space 12, the work retainer 9 of the work transferring mechanism 8 is moving forwards toward the main spindle 3. Further, in the present embodiment, the machining space 12 and the transferring space 13 are arranged adjacent to each other in the front-rear direction, so that the work retainer 9 of the work transferring mechanism 8 can move to the position where it faces the front surface of the main spindle 3 even when the work 10 is being machined. That is, during the machining of the work 10, it is possible to transfer the work 10 preliminarily to the vicinity of the main spindle 3 by the work transferring mechanism 8, so that it is possible to shorten the operation time.

Figure 7:
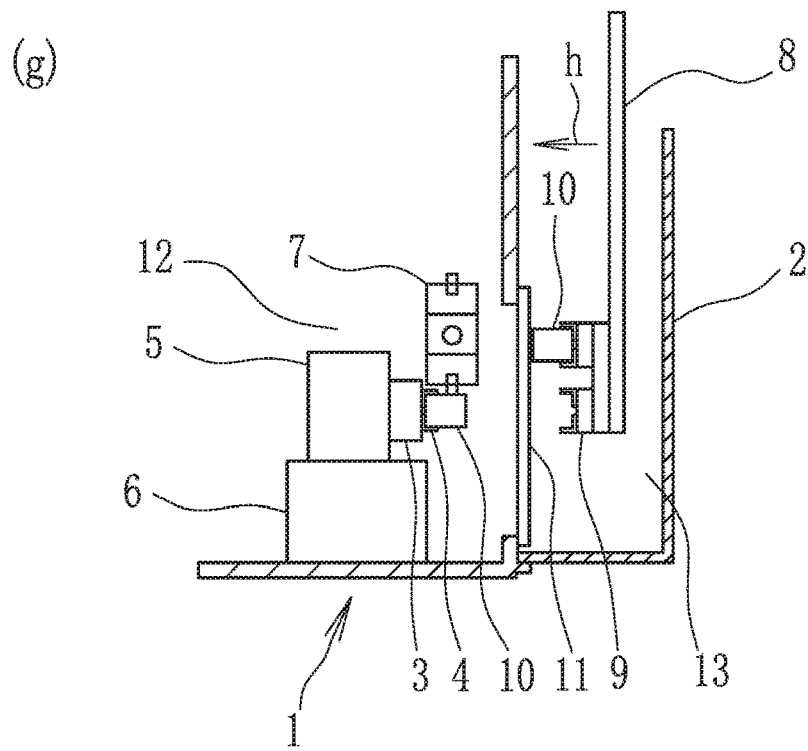
FIG. 7 is a side view illustrating an operation process subsequent to that of FIG. 6, of which portion (g) is a side view illustrating a state in which the work retainer has preliminarily approached toward the shutter, and portion (h) is a side view illustrating a state in which the machining of the work has been completed.
Figure 7:
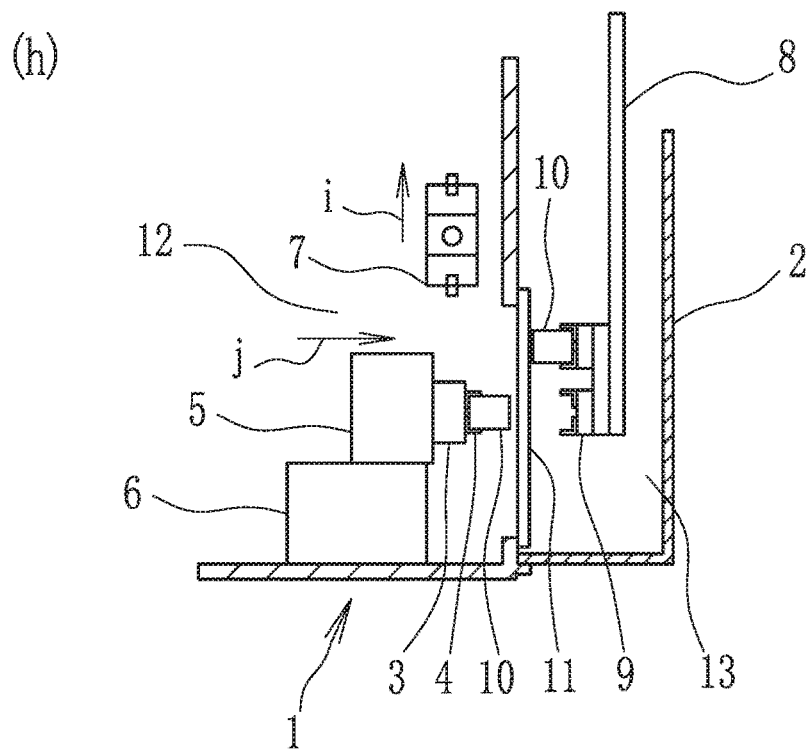

FIG. 7(*g*) illustrates the state in which the work retainer 9 has preliminarily approached the shutter 11. In the state of this drawing, the work 10 is being machined, and the shutter 11 is closed. In this state, the work retainer 9 preliminarily approaches the shutter 11 (arrow h) and is on standby. The work retainer 9 of the work transferring mechanism retains the work to be machined, so that the standby position is, for example, the position where the tip end (machining chamber side end portion) of the work retained by the work retainer 9 is immediately before the shutter (e.g., a position close to the shutter surface, preferably at a position where the distance from the work tip end to the shutter surface is 1 mm to 10 mm). While it is thus on standby, the work retainer 9 may or may not be at rest. As a result, after the completion of the machining of the work 10, the work retainer 9 can quickly approach the main spindle 3, making it possible to shorten the operation time.

Further, in FIG. 6(*f*), the empty portion (lower side) of the work retainer 9 has preliminarily moved to the position where it faces the front surface of the main spindle 3, so that, for the work retainer 9 to receive the work 10 attached to the main spindle 3 from the state of FIG. 7(*g*), movement of the work retainer 9 in one direction suffices. This also helps to shorten the operation time.

In the case where the step in which the work retainer 9 preliminarily approaches the shutter 11 as illustrated in FIG. 7(*g*) is omitted, the work retainer 9 is on standby in the state in which the work transferring mechanism 8 has moved to the vicinity of the main spindle as illustrated in FIG. 6(*f*). Also in this case, the work retainer 9 can quickly approach the main spindle 3 after the completion of the machining of the work 10, making it possible to shorten the operation time.

FIG. 7(*h*) illustrates the state after the completion of the machining of the work 10. After the completion of the machining of the work 10, to deliver the work 10 to the work retainer 9, the turret 7 retreats upwards (arrow i). The main spindle 3 advances toward the shutter 11 (arrow j). In this way, the turret 7 retreats upwards, whereby the main spindle 3 can advance without interfering with the turret 7. When the turret 7 has retreated upwards, and the main spindle 3 has advanced to be situated at the standby position, the tip end of the main spindle 3 is in close proximity to the shutter 11. For example, the retreating of the turret 7 and the advancing of the main spindle 3 may be effected simultaneously. Or, the main spindle 3 may begin to advance after the completion of the retreating of the turret 7.

Figure 8:
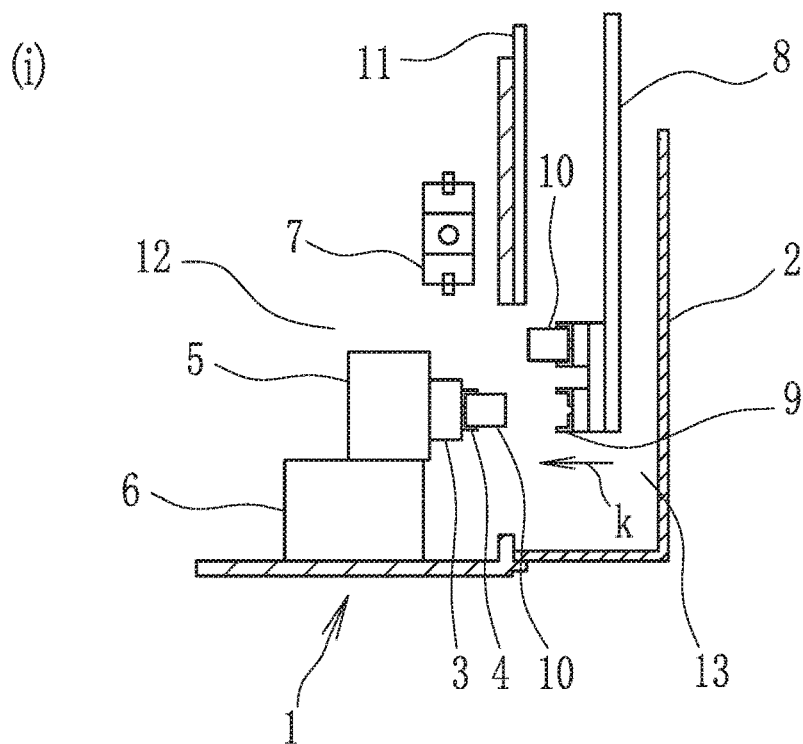
FIG. 8 is a side view illustrating an operation process subsequent to that of FIG. 7, of which portion (i) is a side view illustrating a state in which the shutter is open, and portion (j) is a side view illustrating how the machined work is delivered to the work retainer.
Figure 8:
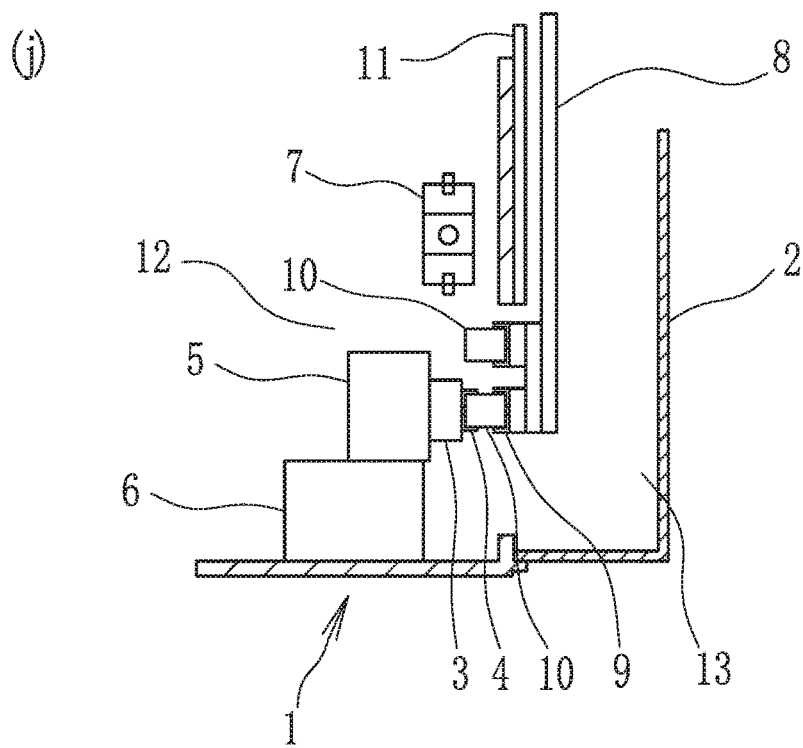
Figure 9:
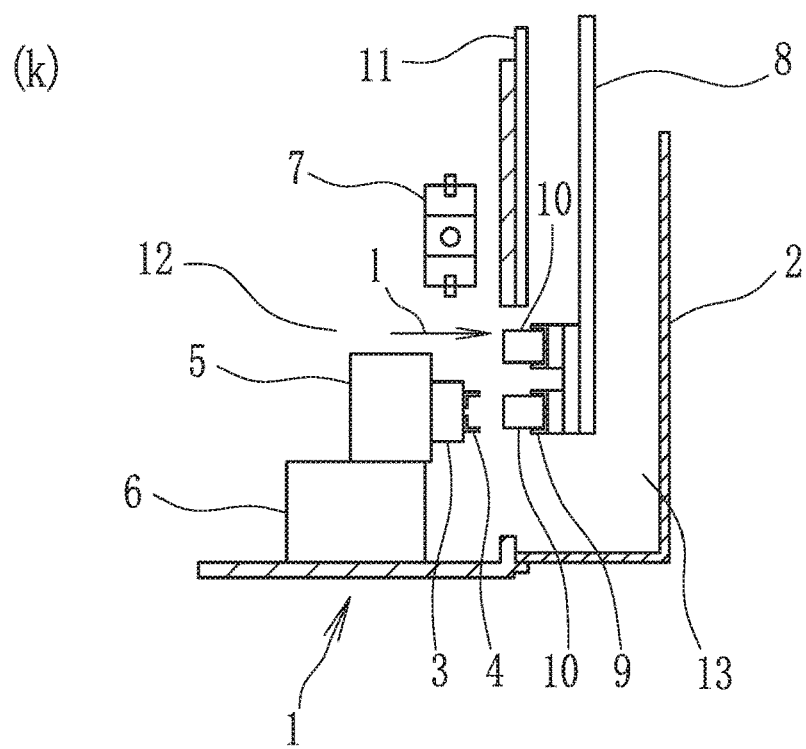
FIG. 9 is a side view illustrating an operation process subsequent to that of FIG. 8, of which portion (k) is a side view illustrating a state in which the work retainer has received the machined work, and portion (1) is a side view illustrating a state immediately before a new work is delivered to the main spindle before machining.
Figure 9:
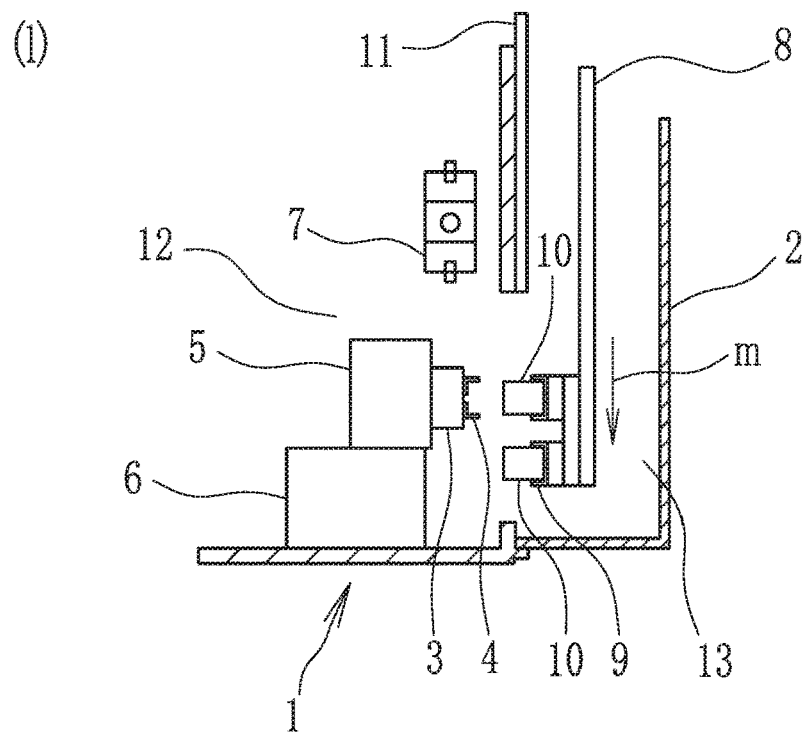
Figure 10:
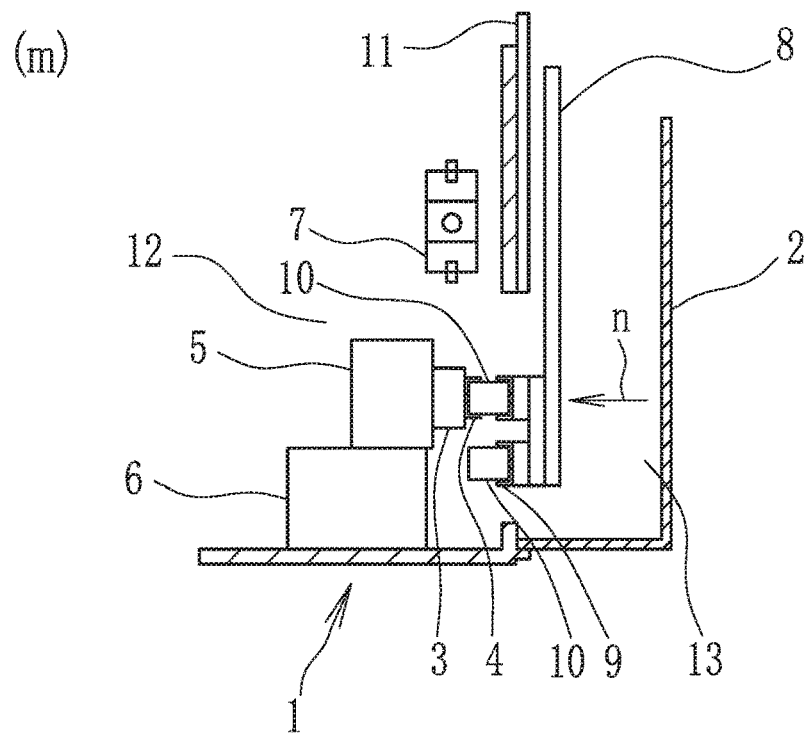
FIG. 10 is a side view illustrating an operation process subsequent to that of FIG. 9, of which portion (m) is a side view illustrating how a new work before machining of the work retainer is attached to the main spindle, and portion (n) is a side view illustrating a state immediately before the machining of the new work.
Figure 10:
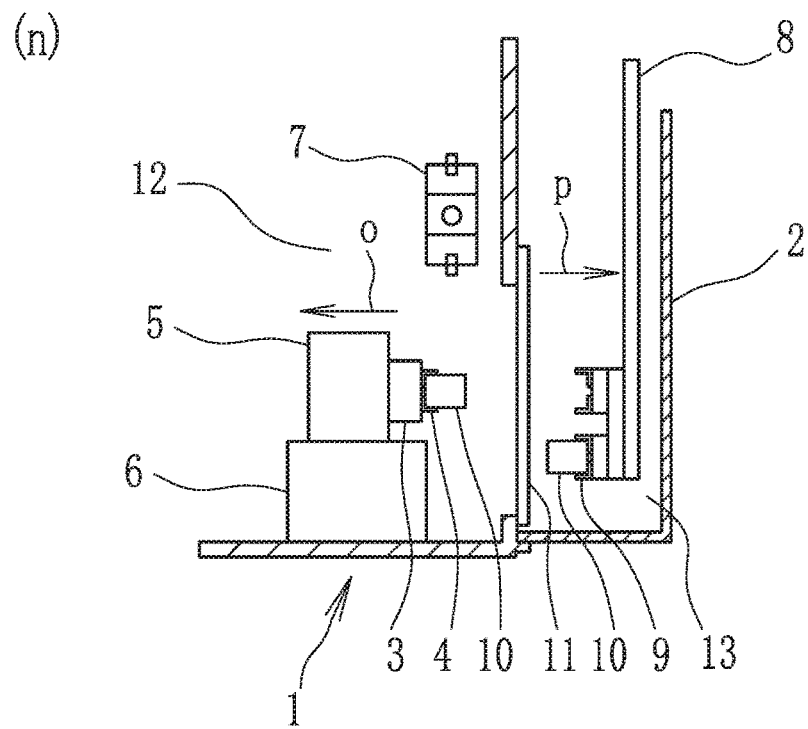
Figure 11:
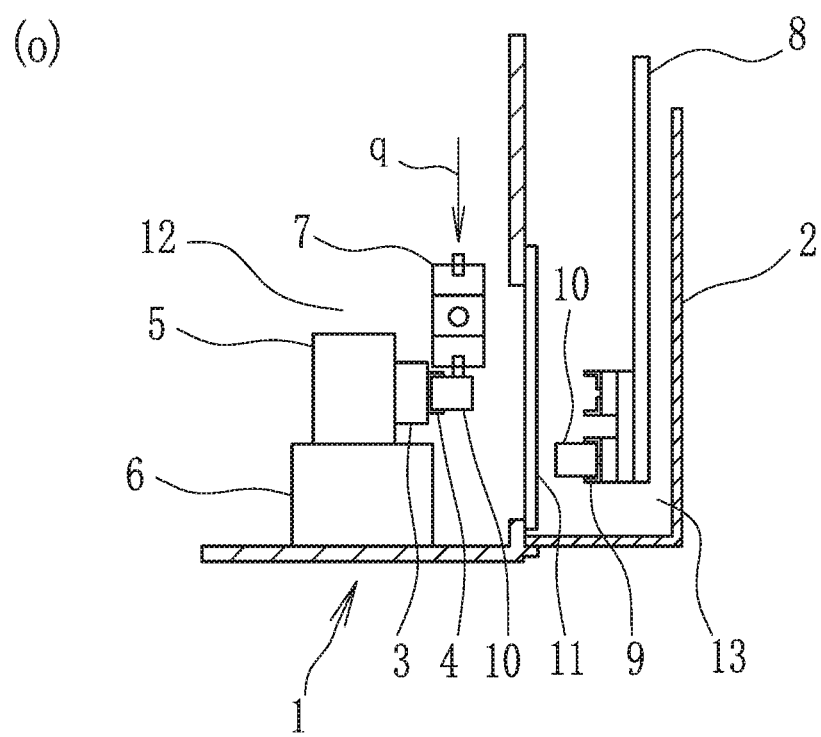
FIG. 11 is a side view illustrating an operation process subsequent to that of FIG. 10, of which portion (o) is a side view illustrating a state in which the work is being machined.

FIG. 8(*i*) illustrates the state in which the shutter 11 is open. In this state, the work retainer 9 of the work transferring mechanism 8 advances toward the main spindle 3 (arrow k), and the machined work 10 is received from the work retainer 9. FIG. 8(j) illustrates the state in which the machined work 10 is being delivered to the work retainer 9. As described above, in FIG. 7(g), the work retainer 9 has preliminarily approached the shutter 11. In addition, in FIG. 7(h), the tip end of the main spindle 3 has also preliminarily approached the shutter 11, so that the advancing distance of the work retainer 9 toward the main spindle 3 is shortened, making it possible to shorten the operation time.

FIG. 9(k) illustrates the state in which the work retainer 9 has received the machined work 10. In this state, the work retainer 9 moves toward the front door 2 (arrow 1), and is away from the main spindle 3. FIG. 9(l) illustrates the state immediately before the delivery of the new, un-machined work 10 to the main spindle 3. In this state, the work retainer 9 has descended from the state of FIG. 9(k) (arrow m), and the new, un-machined work 10 and the main spindle 3 are opposite each other.

FIG. 10(m) illustrates how the new, un-machined work 10 of the work retainer 9 is attached to the main spindle 3. As compared with the state of FIG. 9(l), in the state of this drawing, the work retainer 9 has advanced toward the main spindle 3 (arrow n), and the new, un-machined work 10 has been delivered to the main spindle 3. As described above, in FIG. 7(h), the tip end of the main spindle 3 is in close proximity to the shutter 11, so that the advancing distance of the work retainer 9 of the work transferring mechanism 8 to the main spindle 3 is shortened, making it possible to shorten the operation time.

In other words, the work retainer 9 of the present embodiment has grasping mechanisms consisting, for example, of two vertically arranged loader chucks. The upper grasping mechanism retains the work 10 before machining, and the lower grasping mechanism retains the work 10 after machining. In the state in which the upper grasping mechanism retains the work 10 before machining, the machined work 10 is received from the main spindle 3 by the lower grasping mechanism. Further, in the state in which the lower grasping mechanism has received the machined work 10, it is possible to deliver the un-machined work from the upper grasping mechanism to the main spindle 3. Thus, the work retainer 9 does not return through the transferring space 13, and it is possible to quickly effect with minimum movement the interchange of the machined work 10 and the un-machined work 10 between the main spindle 3 and the work retainer 9.

Preferably, between the moment that the grasping mechanism receives the machined work 10 from the main spindle 3 and the moment that the un-machined work 10 is attached to the main spindle 3, both or either of a part of the machined work 10 and a part of the un-machined work 10 continues to remain in the machining space 12. Thus, in the front-rear direction (see the Y-direction of FIG. 2), it is possible to quickly effect the interchange of the machined work 10 and the un-machined work 10 with less movement.

FIG. 10(n) illustrates the new, un-machined work 10 in the state immediately before machining. In the state of the drawing, the main spindle 3 retreats from the state of FIG. 10(m) to the machining position for the work 10 (arrow o), and the work retainer 9 advances (arrow p) to return to the position where the approach to the main spindle 3 is started (FIG. 8(i)). In the state of this drawing, the shutter 11 is closed, and, as illustrated in FIG. 11(o), the turret 7 descends (arrow q), whereby in the machining space 12, the new, un-machined work 10 attached to the main spindle 3 is machined by the tool attached to the turret 7.

While the new, un-machined work 10 is being machined, the work retainer 9 retaining the machined work 10 moves through the transferring space 13 to deliver the machined work 10 to the next process, and receives a third, un-machined work 10 from the preceding process, transferring the third, un-machined work 10 to the vicinity of the main spindle 3 as in the case of FIG. 6(f). Subsequently, the work retainer 9 undergoes the steps of FIGS. 7(g) through 10(n), whereby the work retainer 9 receives the second, machined work 10, and delivers the third, un-machined work 10 to the main spindle 3, with the third work 10 being machined in the step of FIG. 10(o). After this, the above-described process is repeated, and the machined work 10 is transferred to the next process. At the same time, a new, un-machined work 10 is sent from the preceding process, and the machining of the work 10 progresses successively.

According to the present invention, an embodiment of which has been described above, the space in the machine tool 1 is divided in the front-rear direction into the machining space 12 and the transferring space 13 via the shutter 11, so that even during the machining of the work 10, the work retainer 9 with which the work transferring mechanism 8 is equipped can preliminarily move to the vicinity of the main spindle 3 via the shutter 11. As a result, after the completion of the machining of the work 10, the work retainer 9 can quickly approach the main spindle 3, making it possible to shorten the operation time.

In particular, when the work retainer 9 preliminarily moves to a position where it faces the front surface of the main spindle 3 during the machining of the work, movement of the work retainer 9 in one direction suffices for the work retainer 9 to receive the work 10 attached to the main spindle 3. This also helps to shorten the operation time. Further, when, in addition to the previous movement of the work retainer 9 to the position where it faces the front surface of the main spindle 3, the work retainer 9 preliminarily moves toward the shutter 11, it can approach the main spindle 3 more quickly, thereby further shortening the operation time.

Further, the main spindle 3 can be moved toward the transferring space 13 by a main spindle moving mechanism, so that it is possible to preliminarily move the main spindle 3 toward the transferring space 13 while the work transferring mechanism 8 is transferring the un-machined work 10 or while the turret 7 that has completed the machining is spaced away from the main spindle 3. This helps to shorten the movement distance for the work retainer 9 to receive/deliver the work 10 from/to the main spindle 3, making it possible to shorten the operation time.

The above-described embodiment is solely given by way of example, and allows modification as appropriate. For example, the machine tool 1 is not restricted to a parallel two-main-spindle lathe but may be any other kind of machine tool so long as it is equipped with the main spindle 3 and the work transferring mechanism 8 and the work 10 is received/delivered from/to the main spindle 3 from the work transferring mechanism 8.

REFERENCE SIGNS LIST 1 machine tool with work transferring mechanism
2 front door
3 main spindle
4 chuck
5 main spindle stock
7 turret
8 work transferring mechanism
9 work retainer 10 work
11 shutter
12 machining space
13 transferring space

What is claimed is:

1. A machine tool with work transferring mechanism, comprising a work transferring mechanism that transfers a work and receives/delivers the work from/to a main spindle,
wherein in a front-rear direction, a space inside the machine tool is divided by a shutter into a machining space in which the main spindle is arranged so that a direction of an axis of the main spindle is parallel to the front-rear direction and a transferring space in which the work transferring mechanism transfers the work;
the work transferring mechanism is equipped with a work retainer retaining the work, and a moving mechanism moving the work retainer;
while the work attached to the main spindle is being machined, the work retainer is preliminarily moved in an up-down direction by the moving mechanism to a position where the work retainer faces a front surface of the main spindle next to the shutter, and
after the work attached to the main spindle is machined, the work retainer receives the work by one movement of the work retainer in the front-rear direction.

2. The machine tool with work transferring mechanism according to claim 1, wherein while the work attached to the main spindle is being machined, the work retainer is preliminarily moved by the moving mechanism to a position where the work retainer faces a front surface of the main spindle, and is further moved in the front-rear direction toward the shutter.

3. The machine tool with work transferring mechanism according to claim 1, further comprising a main spindle moving mechanism that moves the main spindle toward the transferring space; wherein when the work is to be received/delivered from/to the main spindle, the main spindle is preliminarily moved toward the transferring space by the main spindle moving mechanism.

4. The machine tool with work transferring mechanism according to claim 1,
wherein in the front-rear direction, the transferring space is positioned in the front of the machine tool, the machining space is positioned in the back of the machine tool, the shutter is positioned between the transferring space and the machining space,
while the work attached to the main spindle is being machined, the main spindle is positioned at the machining space that is divided by the shutter from the transferring space in the front-rear direction and the work retainer is positioned at the transferring space that is divided by the shutter from the machining space in the front-rear direction,
after the work attached to the main spindle is machined, the work retainer moves the work from the machining space to the transferring space, and when work retainer receives the work from the main spindle, at least a portion of the work is positioned in the front-rear direction beyond the shutter at the machining space, and
the work retainer moves another work from the transferring space to the machining space, and when the work retainer transfers the another work to the main spindle, at least a portion of the another work is positioned in the front-rear direction beyond the shutter at the machining space.

* * * * *